United States Patent
Chae et al.

(10) Patent No.: US 10,123,292 B2
(45) Date of Patent: Nov. 6, 2018

(54) METHOD AND APPARATUS FOR TRANSMITTING AND RECEIVING SIGNAL FOR DEVICE-TO-DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Hakseong Kim, Seoul (KR); Inkwon Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/032,582

(22) PCT Filed: Oct. 28, 2014

(86) PCT No.: PCT/KR2014/010193
§ 371 (c)(1),
(2) Date: Apr. 27, 2016

(87) PCT Pub. No.: WO2015/065017
PCT Pub. Date: May 7, 2015

(65) Prior Publication Data
US 2016/0286506 A1    Sep. 29, 2016

Related U.S. Application Data

(60) Provisional application No. 61/896,654, filed on Oct. 28, 2013, provisional application No. 61/925,639, (Continued)

(51) Int. Cl.
*H04W 56/00* (2009.01)
*H04L 5/00* (2006.01)
(Continued)

(52) U.S. Cl.
CPC ......... *H04W 56/002* (2013.01); *H04L 5/0051* (2013.01); *H04L 69/22* (2013.01); *H04W 4/005* (2013.01); *H04B 7/2656* (2013.01)

(58) Field of Classification Search
CPC ... H04B 7/2656; H04B 7/2615; H04L 5/0051; H04L 69/22; H04L 5/26; H04W 4/005; H04W 56/002; H04J 4/00
(Continued)

(56) References Cited

U.S. PATENT DOCUMENTS

2010/0165882 A1    7/2010  Palanki et al.
2011/0268101 A1    11/2011 Wang et al.
(Continued)

FOREIGN PATENT DOCUMENTS

JP          2012-514435 A     6/2012
KR     10-2011-0102935 A     9/2011
(Continued)

OTHER PUBLICATIONS

Ericsson et al., "Synchronization Procedures for D2D Discovery and Communication," R1-132029, 3GPP TSG-RAN WG1 #73, Fukuoka, Japan, May 20-24, 2013, pp. 1-6.
(Continued)

*Primary Examiner* — Robert Lopata
(74) *Attorney, Agent, or Firm* — Birch, Stewart, Kolasch & Birch, LLP

(57) ABSTRACT

Disclosed is a method for transmission of a device-to-device (D2D) signal by a terminal in a wireless communication system. The method for transmission of a D2D signal, according to an embodiment of the present invention, comprises the steps of: a first terminal generating a D2D synchronization signal; and transmitting a subframe comprising the D2D synchronization signal, wherein the D2D synchronization signal comprises a primary D2D synchronization
(Continued)

signal and a secondary D2D synchronization signal, and wherein, if at least one of the primary D2D synchronization signal and the secondary D2D synchronization signal in the subframe comprises two or more sequences that are transmitted in the subframe at different times, the two or more sequences are different from one another.

13 Claims, 8 Drawing Sheets

Related U.S. Application Data filed on Jan. 9, 2014, provisional application No. 61/930,962, filed on Jan. 24, 2014, provisional application No. 61/992,213, filed on May 12, 2014, provisional application No. 62/032,625, filed on Aug. 3, 2014, provisional application No. 62/055,639, filed on Sep. 25, 2014.

(51) Int. Cl.
*H04L 29/06* (2006.01)
*H04W 4/00* (2018.01)
*H04B 7/26* (2006.01)

(58) Field of Classification Search
USPC .......................................................... 370/330
See application file for complete search history.

(56) References Cited

U.S. PATENT DOCUMENTS

| | | | |
|---|---|---|---|
| 2014/0064203 A1 | 3/2014 | Seo et al. | |
| 2014/0219270 A1* | 8/2014 | Ro | H04W 56/002 370/350 |
| 2014/0334456 A1* | 11/2014 | Mukherjee | H04W 74/02 370/336 |
| 2015/0043545 A1* | 2/2015 | Cheng | H04W 56/00 370/336 |
| 2015/0296469 A1* | 10/2015 | Yoon | H04W 56/0015 370/350 |
| 2015/0327201 A1* | 11/2015 | He | H04W 48/16 370/336 |
| 2016/0044620 A1* | 2/2016 | Bagheri | H04W 76/14 370/252 |
| 2016/0212594 A1* | 7/2016 | Morita | H04W 72/10 |
| 2016/0270014 A1* | 9/2016 | Wang | H04W 76/14 |
| 2016/0286507 A1* | 9/2016 | Yang | H04W 8/005 |
| 2016/0323924 A1* | 11/2016 | Nguyen | H04W 76/14 |
| 2017/0006563 A1* | 1/2017 | Lindoff | H04W 56/001 |
| 2017/0013577 A1* | 1/2017 | Berggren | H04B 7/2656 |
| 2017/0078998 A1* | 3/2017 | Li | H04W 56/00 |
| 2017/0142678 A1* | 5/2017 | Yoon | H04W 56/0015 |
| 2017/0142741 A1* | 5/2017 | Kaur | H04W 76/18 |

FOREIGN PATENT DOCUMENTS

| | | |
|---|---|---|
| WO | 2012/128505 A2 | 9/2012 |
| WO | 2013/002688 A1 | 1/2013 |

OTHER PUBLICATIONS

Alcatel-Lucent Shanghai Bell et al., "D2D Discovery design for groupcast, broadcast, and relay," 3GPP TSG RAN WG1 Meeting #74, R1-132995, Barcelona, Spain, Aug. 19-23, 2013, 6 pages.

* cited by examiner

FIG. 5
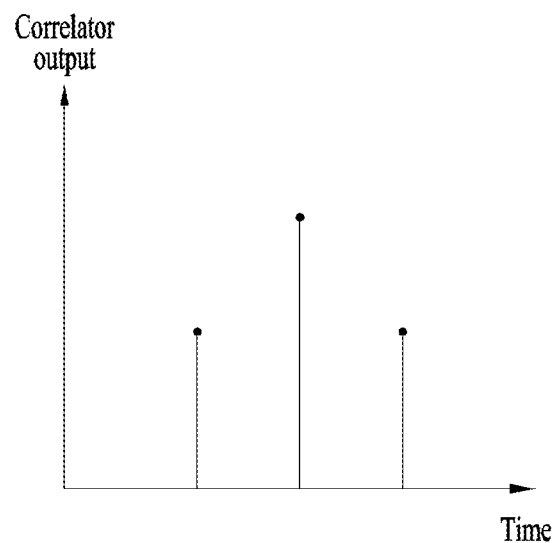
(a)
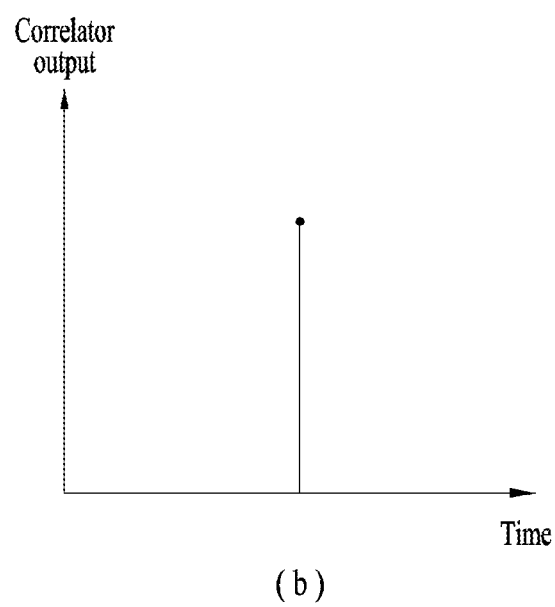
(b)

FIG. 6
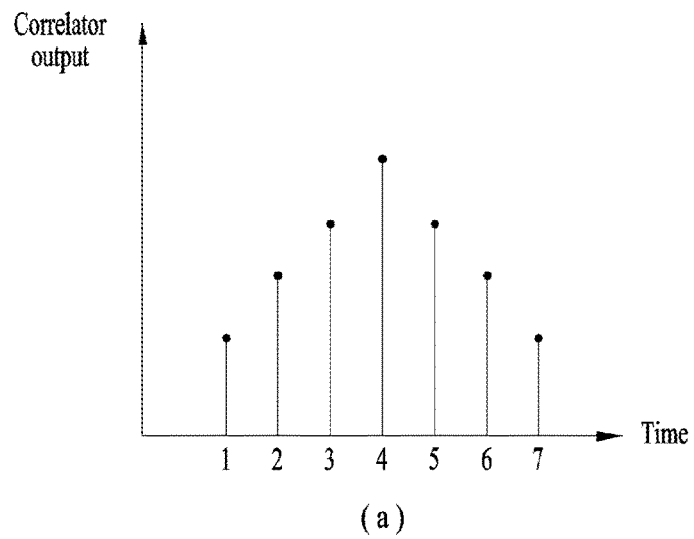
(a)
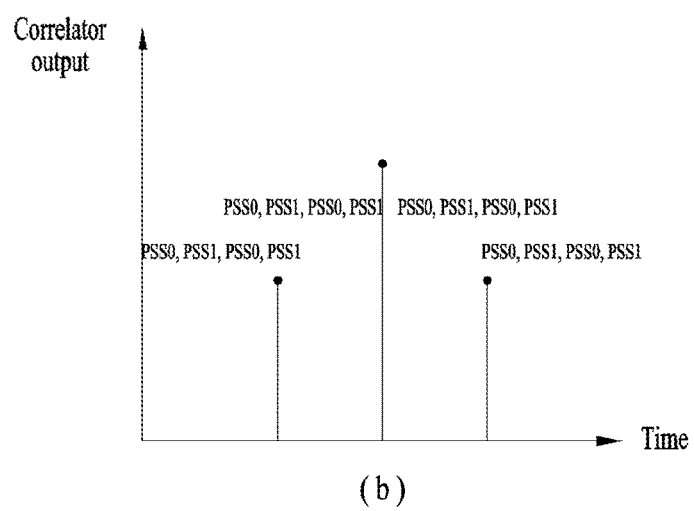
(b)
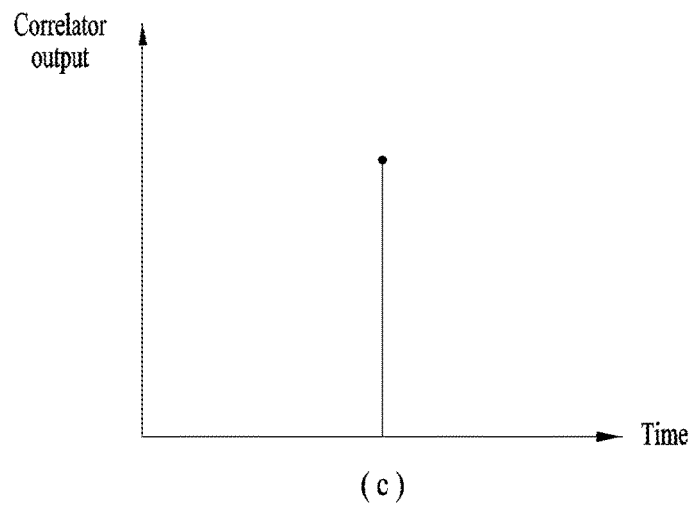
(c)

METHOD AND APPARATUS FOR TRANSMITTING AND RECEIVING SIGNAL FOR DEVICE-TO-DEVICE TERMINAL IN WIRELESS COMMUNICATION SYSTEM

CROSS REFERENCE TO RELATED APPLICATIONS

This application is the National Phase of PCT International Application No. PCT/KR2014/010193, filed on Oct. 28, 2014, which claims priority under 35 U.S.C. 119(e) to U.S. Provisional Application No. 61/896,654, filed on Oct. 28, 2013, U.S. Provisional Application No. 61/925,639, filed on Jan. 9, 2014, U.S. Provisional Application No. 61/930,962, filed on Jan. 24, 2014, U.S. Provisional Application No. 61/992,213, filed on May 12, 2014, U.S. Provisional Application No. 62/032,625, filed on Aug. 3, 2014, and U.S. Provisional Application No. 62/055,639, filed on Sep. 25, 2014, all of which are hereby expressly incorporated by reference into the present application.

TECHNICAL FIELD

The present invention relates to a wireless communication system and, more particularly, to a method and apparatus for transmitting and receiving a device-to-device (D2D) synchronization signal in D2D communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention devised to solve the problem lies in a method of transmitting and receiving a synchronization signal in device-to-device (D2D) communication.

The objects achieved by the present invention are not limited to the above-described objects and those skilled in the art may consider other objects from the following description of the embodiments of the present invention.

Technical Solution

The object of the present invention can be achieved by providing a method of transmitting a device-to-device (D2D) signal at a user equipment (UE) in a wireless communication system including a first UE generating the D2D synchronization signal and transmitting a subframe including the D2D synchronization signal, wherein the D2D synchronization signal includes a primary D2D synchronization signal and a secondary D2D synchronization signal, and, if at least one of the primary D2D synchronization signal and the secondary D2D synchronization signal in the subframe includes two or more sequences transmitted in the subframe at different times, the two or more sequences are different from one another.

In another aspect of the present invention, provided herein is a device-to-device (D2D) user equipment (UE) apparatus for transmitting and receiving a D2D signal in a wireless communication system including a transmission module and a processor, wherein the processor generates the D2D synchronization signal and transmits a subframe including the D2D synchronization signal, and, if at least one of the primary D2D synchronization signal and the secondary D2D synchronization signal in the subframe includes two or more sequences transmitted in the subframe at different times, the two or more sequences are different from one another.

The aspects of the present invention may include all or some of the following features.

The different sequences may be sequences having different root indices or Zadoff-chu sequences having different cyclic shift.

The sequence configuring the primary D2D synchronization signal may be a Zadoff-chu sequence and the sequence configuring the secondary D2D synchronization signal may be an M-sequence.

A root sequence for generating the D2D synchronization signal when the first UE is a synchronization reference node may be different from a root sequence for generating the D2D synchronization signal when the first UE is a node for relaying a synchronization signal.

The subframe in which the D2D synchronization signal is transmitted may indicate whether the first UE is a synchronization reference node or a node for relaying a synchronization signal.

The first UE may indicate whether the first UE is an in-coverage UE or an out-of-coverage UE via a root sequence for generating the D2D synchronization signal in the subframe in which the D2D synchronization signal is transmitted.

If the first UE is a D2D synchronization reference node, an ID used to generate the D2D synchronization signal may succeed to an ID used by a previous synchronization reference node before the first UE becomes the D2D synchronization reference node.

The subframe may include information related to a time when the first UE transmits the D2D synchronization signal.

Information related to the time may be used to estimate change of the synchronization reference node of a UE which receives the D2D synchronization signal.

A reference signal included in the subframe in which the synchronization signal is transmitted may be a sequence generated based on a UE ID, a cell ID or the primary D2D synchronization signal.

The ID used to generate the reference signal may indicate whether the first UE is an in-coverage UE or an out-of-coverage UE.

The D2D synchronization signal may be used as a reference signal for decoding data included in the subframe.

Advantageous Effects

According to the present invention, it is possible to efficiently transmit and receive a synchronization signal in D2D.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and are incorporated in and constitute a part of this application, illustrate embodiment(s) of the present invention and together with the description serve to explain the principle of the present invention.

FIGS. 5 to 7 are diagrams illustrating a D2D synchronization signal and sequence.

BEST MODE

Figure 1:
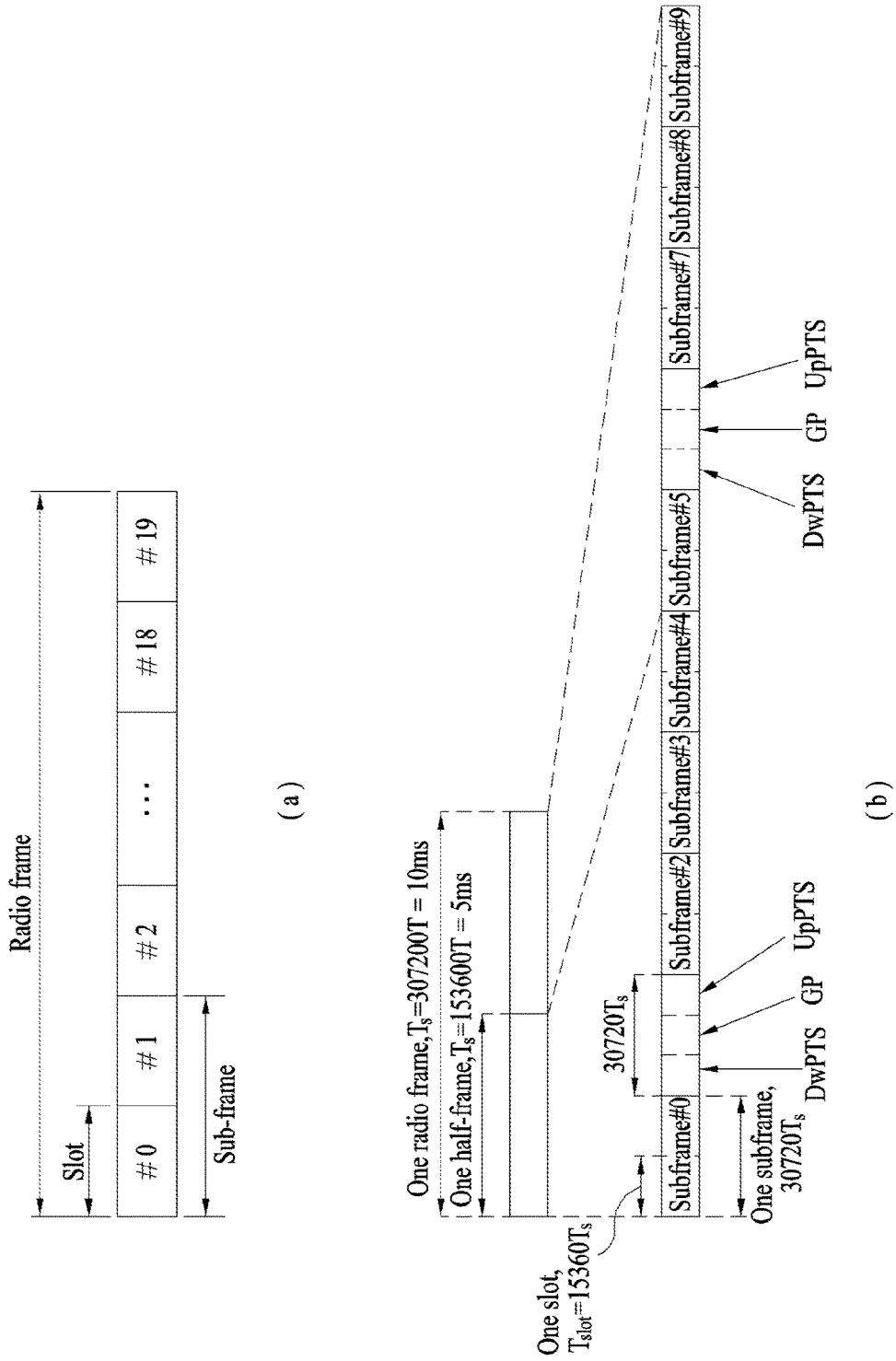
FIG. 1 is a diagram showing the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control Channel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
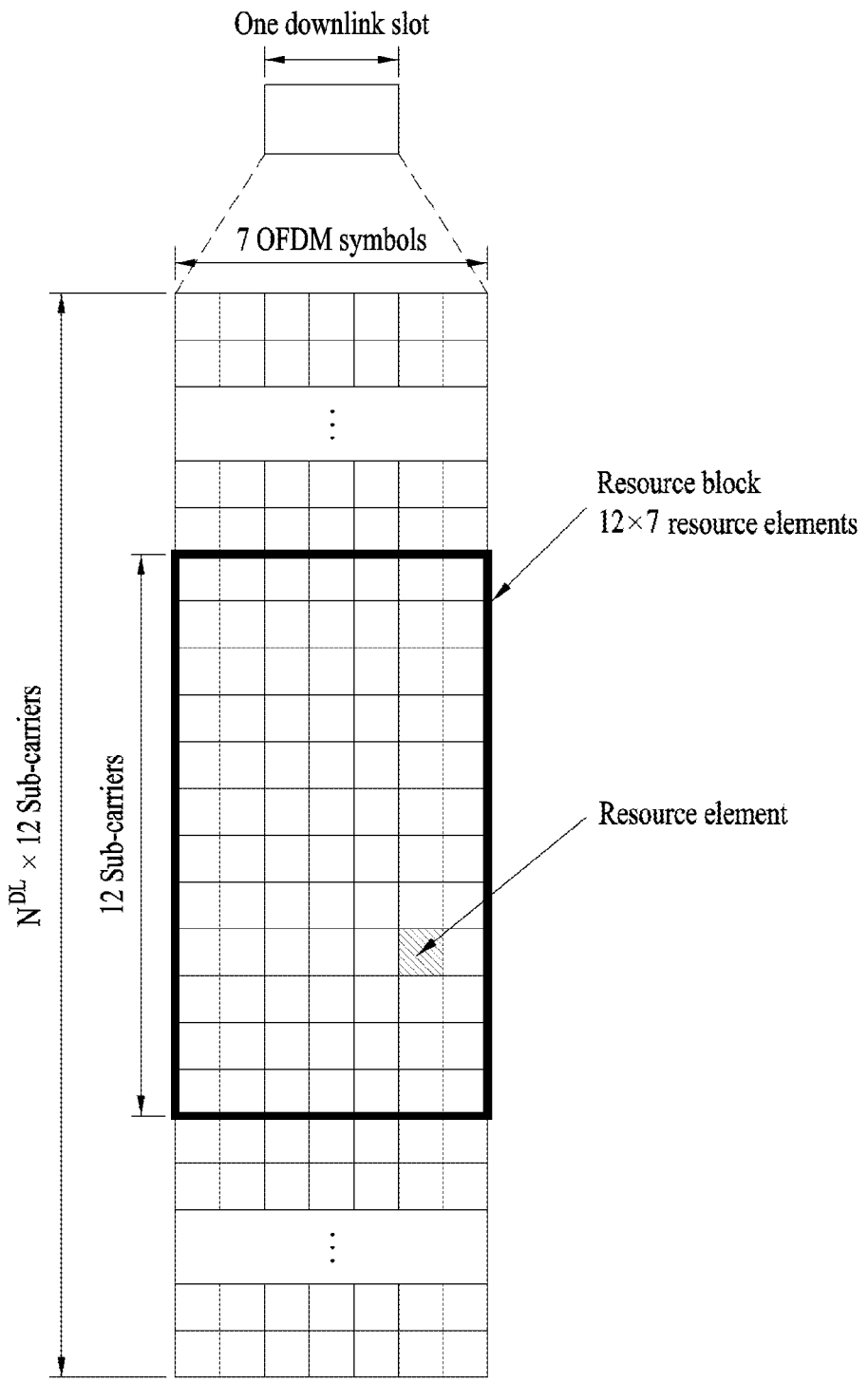
FIG. 2 is a diagram showing resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
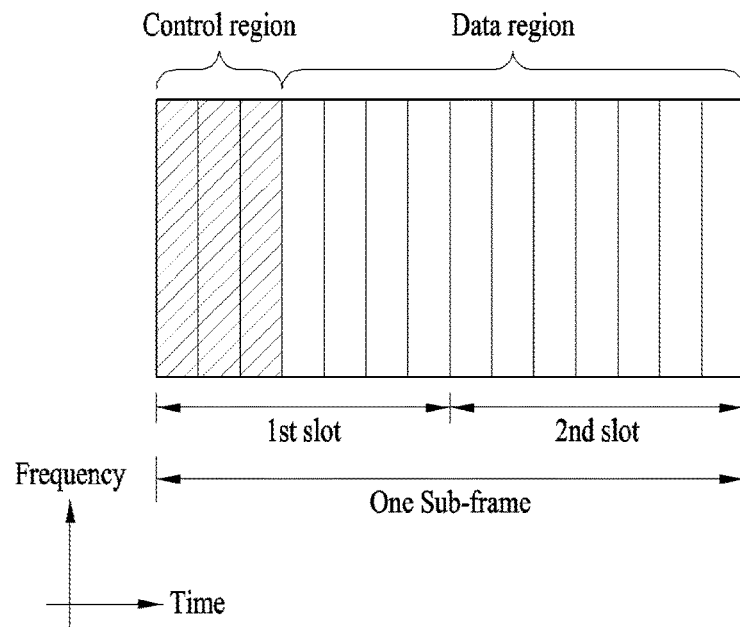
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
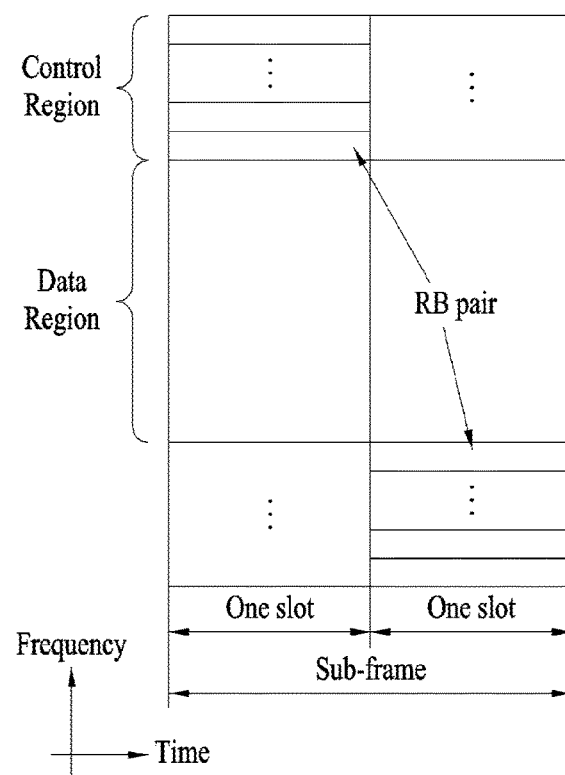
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Hereinafter, a D2D synchronization signal in D2D communication will be described based on the above description and a legacy LTE/LTE-A system. In D2D communication, a synchronization reference UE, that is, a synchronization reference node (SRN) may exist. The SRN may be a node for transmitting a synchronization estimation signal (D2DSS) and a signal including information on the SRN (PD2DSCH). When the SRN exists, a signal transmitted by the SRN may be referred to as a D2D synchronization signal (D2DSS). The D2DSS may be a specific sequence and the PD2DSCH may be a sequence indicating specific information or a codeword subjected to predetermined channel coding.

Here, the SRN may be an eNB or a specific D2D UE. For example, when UEs may perform synchronization with an eNB, the SRN is the eNB and the D2DSS is a PSS/SSS. In case of partial network coverage or out-of-network coverage, a UE may be an SRN. Even in case of intercell discovery, a UE may relay a D2DSS at timing obtained by adding a predetermined offset to timings transmitted from the SRN to UEs of a neighboring cell in order to enable the UEs to be aware of the timings. In this case, although the D2DSS transmitted by the SRN and the relayed D2DSS may be transmitted in the same format, the D2DSS transmitted by the SRN and the relayed D2DSS may be transmitted in different formats in order to check which node performs transmission.

In addition, in the following description, a channel over which information related to a D2DSS or system information, of which a UE should be first aware before transmission and reception of a D2D signal, is transmitted in addition to the D2DSS may be referred to as a physical D2D synchronization channel (PD2DSCH). All or some of information such as D2D frame number (or system frame number), whether D2D frame number is derived by accurate method or not, system BW, TDD configuration, transmission resource pool, receiving resource pool, synchronization source ID, current stratum level, TDD/FDD differentiation, time to scan, PCID of eNB from which UE derives Tx timing, UE power capability, UE power limitation from NW or hop count may be transmitted in the PD2DSCH.

D2D Synchronization Signal and Sequence

A D2D UE (first UE) may generate a D2DSS and then transmit a subframe including the D2DSS. Here, the D2DSS may include a primary D2DSS (PD2DSS) and a secondary D2DSS (SD2DSS). At least one of the PD2DSS or the SD2DSS may include two or more sequences transmitted at different times in a subframe in which the D2DSS is transmitted. For example, the D2DSS including two (or one) PSSs and two (or one) SSSs may be transmitted in one subframe. If two or more PSSs (or SSSs) are transmitted, the PSSs may be different sequences. By such a configuration, a detection probability of a PD2DSS can be significantly increased. The synchronization signal may be transmitted with a frequency relatively less than that of the synchronization signal in a legacy LTE/LTE-A system (e.g., an interval of 40 ms). Since the transmission frequency is low, it is important to increase the detection probability, for D2D synchronization acquisition. This will be described in detail with reference to FIG. 5. FIG. 5 shows a correlation result when two PSSs are transmitted in one subframe. FIG. 5(a) shows the case in which the transmitted two PSSs are the same sequence and FIG. 5(b) shows the case in which the transmitted two PSSs are different sequences. As shown in FIG. 5(a), when the PSSs are the same sequence, three peaks are generated. If a channel environment is bad, a difference between a first peak and a second peak may not be large, thereby leading to timing estimation error. Accordingly, by the PD2DSSs including different sequences, as shown in FIG. 5(b), one peak may be obtained. That is, by transmitting the PD2DSSs including different sequences, it is possible to obtain good timing estimation performance regardless of the channel environment. In the above description, different sequences may mean that the root indices of two sequences are different or two sequences have different cyclic shift values. Alternatively, different sequences may have different root indices and different cyclic shift values. A sequence used as a PD2DSS may be a Zadoff-Chu sequence and a sequence used as an SD2DSS may be an M-sequence.

Figure 7:
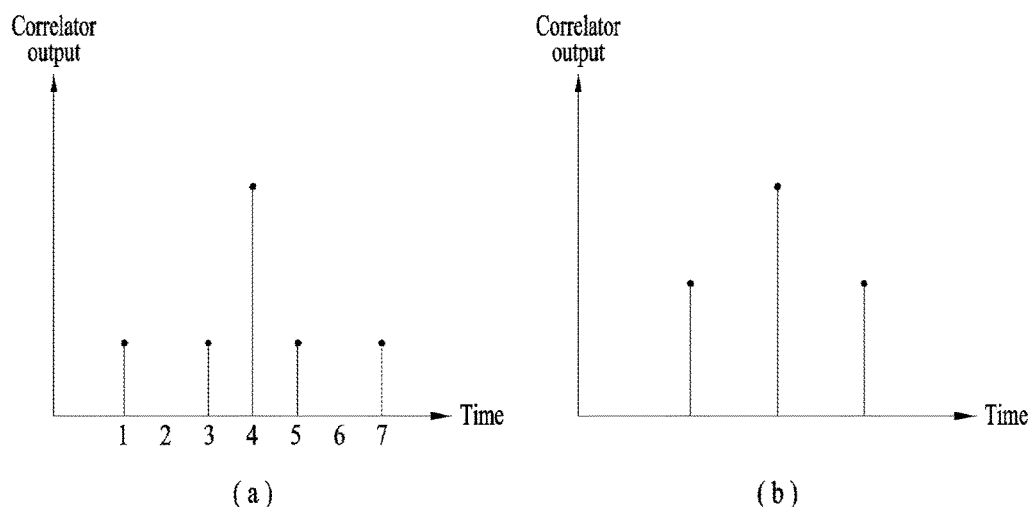

The PD2DSS may include four PSSs as described below, which will be described with reference to FIGS. 6 and 7.

As described in the above-described case in which the PD2DSS includes two PSSs, if four PD2DSSs are repetition of the same sequence, even in case of partial overlapping, a relatively large correlation value may be detected instead of 0. That is, as shown in FIG. 6(a), in case of PD2DSS=[PSS0 PSS0 PSS0 PSS0], the output of the correlator may have a non-zero correlation value in one PSS period. In case of PD2DSS=[PSS0 PSS1 PSS0 PSS1], the correlation result shown in FIG. 6(b) may be obtained. In this case, since a difference between a highest peak and a second highest peak is greater than that of FIG. 6(a), a probability of erroneously detecting timing is decreased. In case of PD2DSS=[PSS0 PSS1 PSS2 PSS3], the correlation result shown in FIG. 6(c) may be obtained. That is, the same sequence should not be repeated from the viewpoint of the correlator, but the same sequence needs to be repeated for symbol level search in a PD2DSS receiver. Accordingly, if the PD2DSS includes N ZC sequences (Zadoff-Chu or Zadoff-Chu sequences), consecutive N/2 ZC sequences may be different from one another and repeated twice to configure the PD2DSS. In this case, it is possible to avoid chip level search and to reduce an error probability due to a large difference between a highest peak and a second highest peak. When the PD2DSS includes N ZC sequences, some of the N ZC sequences are the same and consecutively repeated. At this time, the repeated ZC sequences may be located at the center and the remaining ZC sequences may be 1) the same or 2) different. In an embodiment, PD2DSS=[PSS0 PSS1 PSS1 PSS0]. In this case, while symbol level search is enabled, a difference between a highest peak and a second highest peak of the correlator output may be greater than that of FIG. 6(b). In this embodiment, the correlator output (noise free) may have the shape shown in FIG. 7(a). In an embodiment in which the ZC sequences other than the ZC sequences located at the center are different from one another, PD2DSS=[PSS0 PSS1 PSS1 PSS2] is also enabled. At this time, the correlator output (noise free) may have the shape shown in FIG. 7(b). FIG. 7(b) is different from FIG. 7(a) in that peaks disappear at first and seventh locations. In the structure of the PD2DSS, a receiver first performs symbol level search with respect to PSS1 (that is, first searches for PSS1 in a period of one symbol) and then performs correlation of the whole PD2DSS thereabout at a chip level, thereby accurately finding time synchronization.

Alternatively, if the PD2DSS includes N PSSs, the first N/2 PSSs may include different base sequences and the remaining N/2 PSSs may include sequences arranged in order opposite to the order of the first N/2 sequences, thereby configuring the PD2DSS. For example, in case of N=6, PD2DSS=[PSS0 PSS1 PSS2 PSS2 PSS1 PSS0]. In this case, since the same symbol is repeated once at the center, symbol level search is enabled. In addition, even when the whole PD2DSS is correlated, the correlation property of the whole PD2DSS is also good.

Three PD2DSSs may be configured as follows.
PD2DSS0=[PSS0 PSS1 PSS2 PSS2 PSS1 PSS0]
PD2DSS1=[PSS2 PSS0 PSS1 PSS1 PSS0 PSS2]
PD2DSS2=[PSS1 PSS2 PSS0 PSS0 PSS2 PSS1]

At this time, the first three PSSs have the following properties.
[PSS0 PSS1 PSS2]
[PSS2 PSS0 PSS1]
[PSS1 PSS2 PSS0]

A magic square matrix in which the sum of indices located in horizontal and vertical directions is always 3 is obtained. Even when the PSSs are arranged in opposite order, the same properties are obtained.
[PSS2 PSS1 PSS0]
[PSS1 PSS0 PSS2]
[PSS0 PSS2 PSS1]

In the generated PD2DSS, since different PSSs are arranged at all locations, the correlation between the PD2DSCHs received at the same timing becomes 0. In addition, when correlation is performed after shift, at most 2 PSSs overlap between different two PD2DSSs. If two out of three PSSs overlap due to cyclic shift, the number of overlapping parts is large from the viewpoint of the magic square. However, since the three PSSs are further arranged in opposite order, the number of overlapping parts due to shift is 2 and thus is remarkably reduced as compared to the total length of symbols.

As another example, if the PD2DSS includes PSSs of two symbols in one subframe, the PSSs of different root sequences such as PSS0 and PSS1 may be configured.

The above-described structure of the PD2DSS is similarly applicable to an SD2DSS.

As to D2D Synchronization Signal Format

The D2D synchronization signal format according an embodiment of the present invention may be changed/distinguished according to transmission node. More specifically, depending on whether a UE for transmitting a D2D synchronization signal is a synchronization reference node or a node for relaying a synchronization signal, different D2D synchronization signals (formats) may be used. Here, the synchronization signal format may mean sequence length, sequence ID, root sequence index, cyclic shift, repeat count, transmission location (time and/or frequency), transmission period, etc. Accordingly, change of the synchronization signal format according to the transmission node may mean change of sequence length, change of sequence ID, change of root sequence index, change of cyclic shift, change of repeat count, change of transmission location (time and/or frequency), change of transmission period, etc. according to the property/role/feature of the transmission node.

For example, the root sequence for generating a D2D synchronization signal when the UE for transmitting the synchronization signal is a synchronization reference node may be different from the root sequence for generating the D2D synchronization signal when the first UE is a node for relaying the synchronization signal.

Alternatively, in association with change of the transmission location, depending on whether the UE for transmitting the synchronization signal is an SRN or a relay node, a subframe in which a D2D synchronization signal is transmitted (or the period of the subframe) may be changed. That is, the subframe in which the D2D synchronization signal is transmitted may indicate whether the UE is a synchronization reference node or a node for relaying the synchronization signal.

Further, the D2D synchronization signal format may be changed depending on whether the D2D UE is an in-coverage UE or an out-of-coverage UE. That is, the UE may indicate whether the first UE is an in-coverage UE or an out-of-coverage UE via the root sequence for generating the D2D synchronization signal in the subframe in which the D2D synchronization signal is transmitted.

The format may be changed according to all or some of the above-described items. In the present invention, the SRN and the UE for relaying the synchronization signal use the same format and may perform transmission at different timings. As another example, the synchronization signal transmitted by the SRN may be transmitted in the form in which the PSS is repeated using ZC having a length of 63, in which the PSS is repeated in 6 RBs located at the center, and the UE for relaying the synchronization signal may transmit the D2DSS using ZC having a length of 139 at different timings. In addition, the CSs of the ZC transmitted by the UE may be different from each other.

Even in the same type of SRN, when the node is changed, the format of the D2D synchronization signal may be changed. When a specific node continuously transmits a synchronization signal, the node considers battery shortage. Accordingly, when a predetermined time elapses, the node for transmitting the synchronization signal may be changed. At this time, UEs which receive the synchronization signal may change the format of the D2DSS in order to know that the node for transmitting the synchronization signal is changed. Even when the format is changed (that is, the subject is changed due to battery problems even in the case of the same type of SRN), the format may be changed according to all or some of the above-described items described in "change of the format according to the transmission node".

Alternatively, the lengths of the PSS and/or the SSS may be different. For example, a prime number is preferably used because many root sequences having good cross correlation properties may be used when PPSs need to be classified. Accordingly, the PD2DSS does not use a legacy PSS length but uses a prime number such as 67, and the SSS may use an M-sequence of $2^{\wedge}AM-1$.

Meanwhile, the PD2DSS may include a ZC sequence or M-sequence. Since the PAPRs of the ZC sequence and M-sequence are different, coverage may be changed. Accordingly, when a PSS and an SSS are repeatedly transmitted, the repeat count of the SSS may be greater than that of the PPP. For example, when a D2DSS is transmitted at a period of 100 ms, the PSS may be repeated M times and transmitted and the SSS may be repeated (M+a) times and transmitted (M and a are predetermined natural numbers). At this time, when the repeat count of the SSS is greater than that of the PSS, the last SSS may have a specific format in order to identify the end of the synchronization signal. The length of the ZC sequence may be determined as follows. A legacy PSS is transmitted based on ZC and has three different root sequences. This is because the length of the PSS is adjusted to fit the length of the M-sequence of the SSS (2^M−1, 31*2+1(DC carrier)=63 by a combination of two SSSs). If the D2DSS includes only PSSs, such restriction is not necessary. Further, if the PSS is transmitted in a region other than 6 RBs located at the center of the frequency axis, a DC carrier is not necessary and thus a length of 63 does not need to be maintained. Alternatively, even when the D2DSS is a combination of a ZC sequence and an M-sequence, the lengths of the ZC sequence and the M-sequence may be different. If a PD2DSS is a ZC sequence, the length of one ZC is preferably a prime number. Accordingly, one of the prime numbers of Table 1 below may be used as the length of the ZC of the D2DSS.

TABLE 1

3, 5, 7, 11, 13, 17, 19, 23, 29, 31, 37, 41, 43, 47, 53, 59, 61, 67, 71, 73, 79, 83, 89, 97, 101, 103, 107, 109, 113, 127, 131, 137, 139, 149, 151, 157, 163, 167, 173, 179, 181, 191, 193, 197, 199, 211, 223, 227, 229, 233, 239, 241, 251, 257, 263, 269, 271, 277, 281, 283, 293, 307, 311, 313, 317, 331, 337, 347, 349, 353, 359, 367, 373, 379, 383, 389, 397, 401, 409, 419, 421, 431, 433, 439, 443, 449, 457, 461, 463, 467, 479, 487, 491, 499, 503, 509, 521, 523, 541, 547, 557, 563, 569, 571, 577, 587, 593, 599, 601, 607, 613, 617, 619, 631, 641, 643, 647, 653, 659, 661, 673, 677, 683, 691, 701, 709, 719, 727, 733, 739, 743, 751, 757, 761, 769, 773, 787, 797, 809, 811, 821, 823, 827, 829, 839, 853, 857, 859, 863, 877, 881, 883, 887

In the prime numbers of Table 1 above, when the subsequent SD2DSS is an M-sequence, the length of the SD2DSS is unlikely to be a prime number. In this case, the ZC sequence having the same length as the SD2DSS may be used to adjust the length of the PSS to fit the length of the SD2DSS. Alternatively, in order to maintain operation of the PSS receiver in D2D, ZC having a length of 63 may be used like a legacy PSS. At this time, 139 is for PRACH format 4 and subcarrier spacing of 7.5 kHz is used for mapping within 6 RBs. PRACH format 4 has a length of 4096 Ts, which is equal to the length of 2 OFDM symbols. Accordingly, in PRACH format 4, the ZC sequence having a length of 139 may be used as the whole or partial structure of the D2DSS.

If the D2DSS is transmitted in 6 RBs or less, subcarrier spacing of 15 kHz of data may become narrow. For example, ZC having a length of 139 is used and, when transmission is performed in 2 RBs, subcarrier spacing may become 2.5 kHz and the symbol length may be about six OFDM symbols in the time domain. Alternatively, when transmission is performed in 1 RB, 1.25 kHz, which is the subcarrier spacing of existing PRACH formats 0 to 3, may be used. At this time, the length of one ZC sequence occupies about 12 OFDM symbols. In such design, since the size of frequency resources occupied by one UE is reduced, the UEs may transmit the D2DSS at different frequency locations to identify the UE type or the resource location or distribute load of the resources used to transmit the synchronization signal per UE group. The number of RBs, to which such a D2DSS is mapped, is configurable. At this time, the RB in which the D2DSS is transmitted and the RB size may be predetermined or included in a channel transmitted by a cluster header or an SRN. For example, the ZC having the length of 139 may generate 139 orthogonal sequences by different cyclic shifts (CSs). At this time, the number of used CSs is restricted due to delay spread and time uncertainty of a D2D range. When the legacy PRACH format 4 is used for the D2DSS, seven cyclic shift configurations may be used in format 4, which is shown in Table 2 below.

TABLE 2

| ZeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |

The root sequence may use the order shown in Table 3 below.

TABLE 3

| Logical sequence number | Physical root sequence number u (In increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-839 | N/A | | | | | | | | | | | | | | | | | | | |

Even in the ZC used in D2D, the CSs shown in Table 2 may be used. Alternatively, a predetermined CS combination may be used. Fundamentally, PRACH format 4 is used in UpPTS of a small cell and the CS combination is determined in consideration of a radius of about 1.5 km. Accordingly, when the D2D radius is equal to or less than 1.5 km, other CS combinations may be used. In addition, the UE may change the root sequence in predetermined order in every transmission and perform transmission. For example, the order of changing the root sequence may follow Table 3.

Figure 8:
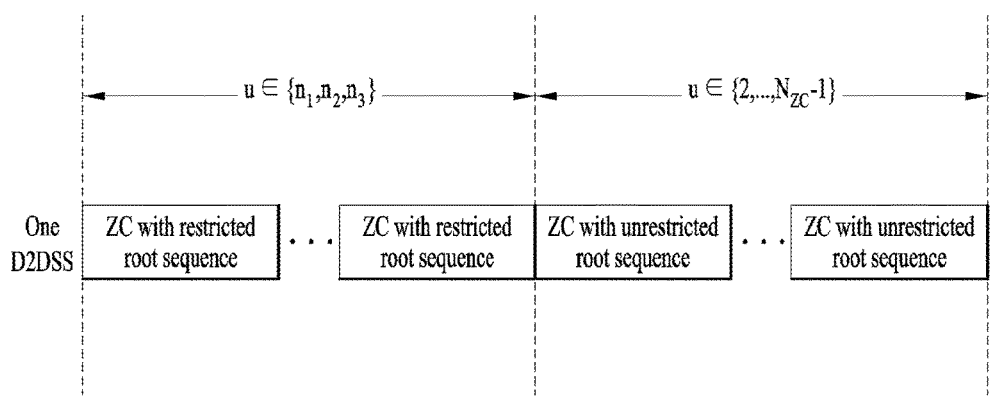
FIG. 8 is a diagram illustrating a D2D synchronization signal format.

When a PD2DSS is configured by repetition of the above-described ZC sequence, as shown in FIG. 8, the number of indices of the root sequences of the first or M-th transmitted ZC sequence is preferably restricted to a predetermined number or less. This is because synchronization estimation using a predetermined number or less of root sequences is more advantageous than performing correlation using too many root sequences upon initial synchronization estimation in terms of complexity and energy gain may be generated by the effect of combination of root sequences with an SFN when the synchronization signal is relayed. The sequence configured after ZC combination for initial synchronization estimation is an M-sequence like the SSS or is ZC with an unrestricted root sequence when ZC is used. By arranging a combination of many distinct sequences after initial synchronization, more clusters or UEs may be identified.

Subsequently, change of the ID of the ZC sequence (root sequence index) and/or the CS will be described. Some of the CSs may be used by an SRN and the remaining CSs may be used by the UE for relaying the synchronization signal of the SRN. For example, UEs in the same cluster transmit D2DSSs having the same root sequence, the SRN uses CS=0 and the other UEs for relaying the synchronization signal may perform transmission by randomly selecting one of the other CSs equal to or greater than 0 within a predetermined CS set. At this time, the root sequence selected by the SRN may be randomly selected or a root sequence based on a hashed value of a combination thereof with other parameters and/or an SRN UE ID may be used. Alternatively, the root sequence may be changed according to subject for transmitting the D2DSS. For example, the root sequence of the ZC transmitted by the SRN and the root sequence of the UE for relaying the synchronization signal may be different.

In addition, in association with change of a repeat count or period, if a D2DSS includes a specific sequence or a combination of specific sequences, the repeat count (the length of combined specific sequences) and transmission period of the SRN may be different from those of the UE for relaying the synchronization signal. For example, if the transmission period of the SRN is 100 ms and ZC is repeatedly transmitted N1 times (or a combination of the same or different root sequences), the UE for relaying the synchronization signal may perform transmission at a transmission period of 0.5 seconds N2 times (or a combination of the same or different root sequences), in order to infrequently check the synchronization signal of the neighboring cluster while frequently detecting the synchronization signal from the SRN thereof and to minimize power consumption of the UE for relaying the synchronization signal.

Some of the above-described D2DSS formats may be used for random access between D2D UEs. When a D2D UE requests scheduling from another UE, a legacy PRACH preamble may be reused or a modification thereof may be used. The D2D random access preamble is likely to use PRACH format 4 due to a narrow range. However, since a D2D preamble is likely to undergo relatively high interference, a new format may be configured by the above-described repetition method or a combination of several ZCs. Alternatively, unlike the legacy RACH format, the new format may be used for the preamble of the D2D RACH using the ZC having the same length as the length of the PSS.

Structure of D2D Synchronization Signal/Subframe in which D2D Synchronization Signal is Transmitted Hereinafter, the structure of a D2D synchronization signal and/or the structure of a subframe, in which the D2D synchronization signal is transmitted, according to the embodiment of the present invention will be described.

First, the below-described PSS/SSS and the D2DSS have the following properties and problems related thereto. The synchronization signal is transmitted at an interval of 5 ms, 500 IDs may be identified, a PSS should be non-coherently detected, and only three hypotheses exist. Therefore, a reception UE detects only three hypotheses. An SSS may be coherently detected using the PSS as a reference signal. The period of the D2DSS may be greater than that of the PSS/SSS. Accordingly, when UEs perform chip level search, power consumption may significantly increase. (An uncertain region is increased by the period of the D2DSS (a correlator should be operated during a period longer than that of the PSS/SSS.)) If the time repetition structure of the same sequence is used, chip level search may be implemented as symbol level search. A long period may mean that it is difficult to secure sufficient energy. That is, since the period of the D2DSS is long, when the same format as the legacy PSS/SS is transmitted, energy is insufficient and thus efficient synchronization performance cannot be secured. Accordingly, in order to secure energy, instead of one or two symbols, all synchronization sequences may be transmitted within one subframe or slot.

In addition, in the D2DSS, if there is no centralized control node, sequences having the same IDs are likely to be transmitted between the SRNs. When a subframe number is used, if SRNs have the same hop or if the SRNs are close to each other, energy boosting effect and frequency offset averaging effect (marginal) may be obtained. If the sequences of different hops have the same SFN, a reception UE may obtain wrong timing according to different delay differences. Even in the same hop, when faraway SRNs use the same sequence, similarly, a reception UE may obtain wrong timing. Such a problem may be solved by including a hop counter in a PD2DSCH to distinguish between hops and the ID information of the SRN may be included in the PD2DSCH or the D2DSS transmitted by the SRN may be identified by the SD2DSS.

Alternatively, a method of identifying a plurality of IDs via coherent detection after coarse time synchronization may be used. To this end, information on an SSS structure or a synchronization source may be included in a PD2DSCH.

Since a PSS has a high collision probability, ZC sequences having IDs greater in number than the number of IDs of a PSS which is a legacy eNB synchronization signal may be needed. However, use of too many root sequences undesirably increases only a non-coherent detection count. A legacy PSS may not be used without change. When an SSS is not transmitted together, a prime number of ZCs may be used. In case of an eNB having good cell planning, PSSs may be arranged not to collide with each other (in some cases, an SFN may be needed, e.g., in CoMP scenario 4). However, since it is difficult to apply a cell planning method to D2D, an undesired SFN may be used. Planning for a D2DSS ID may be controlled by an eNB in case of an in-network UE, but out-of-coverage D2D UEs are likely to randomly select D2DSSs to perform transmission. In addition, due to ACG problems, the first some symbols cannot be detected and may be used as a stabilizing period. In addition, all or some of the last symbols may not be used due to Tx/Rx switching.

In consideration of the above-described properties and problems, the whole or part of the first period of the D2DSS may be used for ACG training. If a structure in which a specific signal is repeated in order to avoid chip level search, an AGC period may not be included. In a PD2DSS, a prime number of ZCs may be repeated. However, the number of ZC may not be a prime number such that the length of the PD2DSS becomes equal to that of the SSS. Alternatively, a legacy PSS may be repeated and a ZC sequence having longer subcarrier spacing, such as RACH, may be repeated. The D2DSS may have a plurality of IDs, an SD2DSS having a structure (M-sequence) equal or similar to a legacy SSS may be formed, or a PD2DSCH (if there is no SD2DSS, information for identifying an ID may be included in the PD2DSCH) may be transmitted by the SRN.

Figure 9:
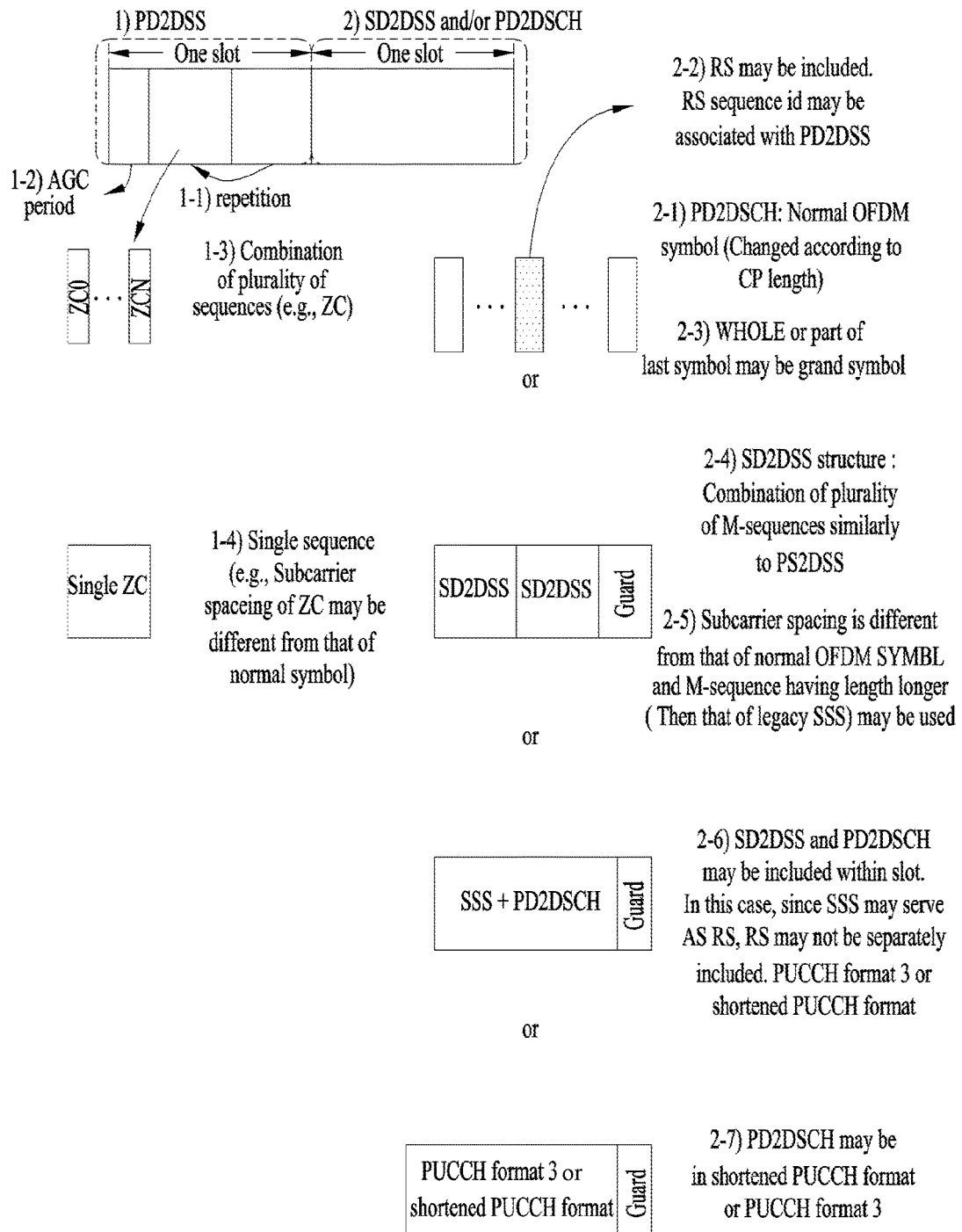
FIGS. 9 to 10 are diagrams illustrating the structure of a D2D synchronization signal and a subframe in which the D2D synchronization signal is transmitted.

Hereinafter, the detailed/individual structure of a D2DSSD will be described with reference to FIG. 9. In the following description, an identification number 'n)' corresponds to the identification number of FIG. 9. A description of each identification number may be included in one embodiment or a combination of two or more descriptions may be included in one embodiment.

1) The main purpose of a PD2DSS is to find a slot boundary. An SSS precedes a legacy PSS. Since a ZC sequence having a long or short length may be repeated in order to secure energy, borrowing a repetition structure is advantageous from the viewpoint of a D2D reception UE. Accordingly, the SSS is rarely located together within one slot and the PSS precedes the SSS. Of course, if the period of the D2DSS is short, coexistence with the SSS within one slot is possible. Why the PD2DSS is not located in a second slot of the subframe is because a guard period for Tx/Rx switching may be included after D2DSS transmission.

1-1) Use of the repetition structure of the same sequence is advantageous from the viewpoint of reception because chip level correlation is not performed. At this time, as shown, one block is repeated twice and it is preferable that CP is not included in each block. However, CP may be included in order to use the legacy symbol structure. In this case, a signal including CP is considered one block and a receiver may perform correlation operation in units of one block.

1-2) A stabilizing period for AGC may or may not be included. If the stabilizing period is included, a last period of a first repeated block may be a period which is duplicated like CP or a period in which a garbage sequence or a predetermined sequence is transmitted. That is, if the period for AGC is separately set, the D2DSS is mapped to a region excluding the AGC period within the subframe.

1-3) If one repeated block includes a combination of a plurality of ZC sequences, a CP period may be included between sequences (in order to reuse a legacy normal OFDM symbol structure, combined ZC including CP is one sequence and may be repeated) or the block may be repeated without CP as in 1-4). That is, a collection of unused CP periods may be arranged at a front part and may be a period, in which the garbage signal is transmitted, as the AGC period of 1-2.

1-4) A single ZC sequence may be repeated. At this time, one ZC may occupy the length of several OFDM symbols. To this end, one ZC may be transmitted in the time domain or subcarrier spacing may be less than that of the normal OFDM symbol if ZC is RE-mapped in the frequency domain. For example, subcarrier spacing similar to that of the PRACH format may be used.

2) An SD2DSS or PD2DSCH may be concatenated after the PD2DSS or may be transmitted in a separate subframe. The SD2DSS has the structure of the M-sequence (the structure similar to that of the SSS), several M-sequence structure having a length of one symbol may be combined, subcarrier spacing may be further reduced similarly to 1-4) and a single or plurality of lengthened M-sequence structures may be used.

2-1) One slot or subframe may be filled with only a PD2DSCH. At this time, a plurality of normal OFDM symbols may configure one slot (the number of symbols may be changed according to CP length).

2-2) If the remaining region of one slot or subframe is filled with only a PD2DSCH, one or two symbols (PUSCH long block or short block structure) may be an RS, like legacy SC-FDM. At this time, an RS sequence ID may be a sequence associated with a PD2DSS or a sequence associated with a UE ID or cell ID. Alternatively, the RS sequence ID may be randomly set or a sequence of a predetermined specific ID. In addition to the RS sequence ID, a CS may be associated with a PD2DSS, a UE ID or a cell ID. Alternatively, the CS may be randomly set in order to avoid interference. This RS may be interpreted as an SSS and, in this case, may be an M-sequence. In the SSS, the ID may be determined by the ID of the D2DSS.

2-3) The whole or some of the last symbols may be grand symbols or a period associated with uplink TA according to D2DSS transmission timing. In this case, the number of grand symbols is not one but may be equal to the length of several OFDM symbols.

2-4) If the SD2DSS is filled in a part of the second slot, a combination of a plurality of M-sequences may be used.

2-5) If the SD2DSS is filled in a part of the second slot, subcarrier spacing is different from that of the normal OFDM symbol and thus an M-sequence having a symbol length different from that of the normal OFDM symbol may be filled.

2-6) The SD2DSS and the PD2DSCH may be subjected to TDM and included within one slot. At this time, for PD2DSCH demodulation, the symbols of the SD2DSS and the PD2DSCH may be interleaved, the SD2DSS symbols surround the PD2DSCH symbols or the SD2DSS may be located after the PD2DSCH.

2-7) Payload may be transmitted in a state in which the PD2DSCH is in PUCCH format 3, PUCCH format 1a/1b or shortened PUCCH format. At this time, the RB size may be likely to be 6 RBs. The RB size is preferably equal to the size of the PD2DSS. The RS may be a 6-RB DMRS, the number of 1-RB DMRSs may be equal to the number of PD2DSCH RBs, or the M-sequence such as SSS may be inserted at the DMRS location. However, the PD2DSCH may not be located at 6 RBs located at the center but may be widely distributed in frequency resources used for D2D transmission. In this case, in the PD2DSCH, the amount of available information may be increased according to bandwidth.

Figure 10:
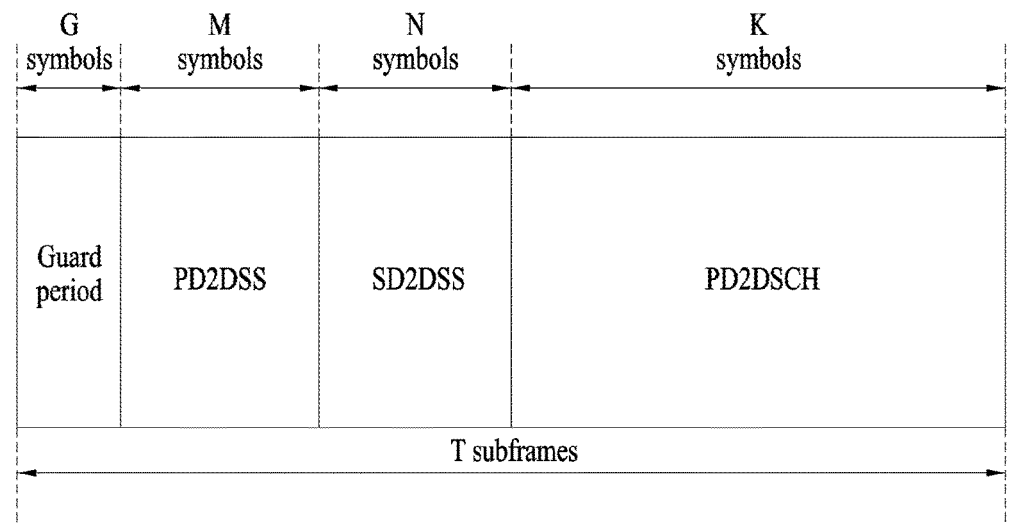

FIG. 10 shows a subframe in which a synchronization signal of another example is transmitted. In FIG. 10, T denotes the number of SFs in which the D2DSS and the PD2DSCH are transmitted, M denotes the number of symbols occupied by the PD2DSS, N denotes the number of symbols occupied by the SD2DSS, G denotes the number of symbols used for the guard period (AGC training), and K denotes the number of symbols occupied by the PD2DSCH. This figure shows a logical structure, actual RE mapping may be performed by performing interleaving between channels at a symbol level, and the bandwidths of the channels may be different from each other. For example, the PD2DSS is at only 6 RBs located at the center but the remaining channels may be transmitted with bandwidth different therefrom. Alternatively, the remaining channels may be transmitted in a frequency region different from the 6 RBs located at the center, may be subjected to frequency hopping, or may be transmitted in a region wider than 6 RBs. For example, the PD2DSS may be transmitted in 6 RBs located at the center and the SD2DSS and the PD2DSCH may be widely transmitted in the entire band, in which the D2D signal is transmitted. At this time, the SD2DSS may also be used as the DMRS of the PD2DSCH. In the above structure, for example, if the D2DSS and the PD2DSCH are multiplexed and transmitted in one SF, (T=1) G=1 and M=N=4 may be set and the remaining symbols may be filled with the PD2DSCH. Such a structure may advantageously secure the number of symbols of the D2DSS regardless of CP length. In such a structure, K is 5 in case of normal CP and is 3 in case of extended CP. In the above-described structure, N may be included in K. This is particularly applicable when the SD2DSS is used as the DMRS of the PD2DSCH. Such a structure may advantageously secure a region for the PD2DSS.

Change of Synchronization Reference Node

A synchronization reference node for transmitting a D2D synchronization signal may be changed from a specific eNB or UE to another eNB or UE. More specifically, in D2D communication, instead of individual synchronization between UEs, when some nodes (SRNs) representatively transmit a synchronization signal in a predetermined period and the other D2D UEs receive the synchronization signal to perform D2D communication based on the synchronization signal, it is possible to reduce power of a UE used to transmit and receive the synchronization signal and a delay time according to distributive synchronization transmission and reception. At this time, when a specific UE which is not an eNB continuously transmits a synchronization signal, the UE may experience battery shortage due to power of the UE consumed to transmit the synchronization signal. Accordingly, instead of fixing the UE for representatively transmitting the synchronization signal, a method of enabling several UEs to alternately transmit the synchronization signal is necessary to uniformly use the power of the UEs.

If the SRN is changed, the SRN may inherit an ID used by the previous SRN as the ID (UE ID, sequence ID, etc.) used to generate the D2D synchronization signal or use a new ID. Hereinafter, these cases will be described.

Case of Inheriting the ID of the Previous SRN

A UE, which has received a D2DSS, cannot recognize that the SRN has been changed and thus is likely to estimate consecutive time/frequency synchronization between a D2DSS previously transmitted from another source and a new D2DSS. However, when the SRN is changed and information indicating that the SRN has been changed is included in a PD2DSCH, a reception UE may confirm that the D2DSS has been changed. More specifically, a subframe in which a D2D synchronization signal is transmitted may include information related to a time for transmitting the D2D synchronization signal. Here, the information related to the time may be timer information or timing information (including a number indicating when the D2DSS disappears) indicating how long the synchronization source transmits the D2DSS. That is, the information related to the time is used for the UE for receiving the D2D synchronization signal to estimate change of the synchronization reference node. In operation of the timer, for example, when a specific SRN is decided to transmit the D2DSS 100 times, information on the number of times of transmission of the D2DSS (a counter is decreased from 100 by 1 whenever transmission is performed) is included in the PD2DSCH. At this time, the transmission periods of the D2DSS and the PD2DSCH are different, for example, when the transmission period of the PD2DSCH is significantly greater than that of the D2DSS, information on the counter obtained by counting the number of times of transmission of the D2DSS in the transmission period of the PD2DSCH and subtracting the number of times of transmission by the counted number of transmission of the D2DSS or other information expressing the same may be included in the PD2DSCH.

Alternatively, the ID of the UE for transmitting the synchronization source or a specific sequence having a short length indicating the ID by hashing the ID may be included in the PD2DSCH to indicate change of the SRN.

Case of Using ID Different from ID of Previous SRN

The D2DSS may include a PD2DSS and an SD2DSS similarly to the PSS/SSS. The D2DSS may include only a PD2DSS. If the PD2DSS is configured based on the PSS, the PSS may be repeated in order to secure energy. Similarly, the SD2DSS may be configured by repeating the SSS. In case of repetition, in order to express more IDs, the same PSS is not repeated but a combination of PSSs having independent IDs may be configured. Similarly, the SD2DSS may include a combination of different SSSs.

At this time, a newly selected SRN may always select a random sequence ID and transmit the D2DSS. Alternatively, the newly selected SRN may first exclude the previously observed (tracked) D2DSS, randomly select one of the remaining sequence IDs and transmit the D2DSS. However, when the D2DSS ID is randomly selected, the same PSS may be used to lead PSS detection performance deterioration. Accordingly, different PSSs need to be selected. The newly selected SRN may randomly select one of IDs, the remainders of which are not n upon dividing the newly selected IDs by 3, if the remainder is n (n is one of $\{0, 1, 2\}$ when the IDs of the D2DSSs observed or tracked before transmitting the D2DSS are divided by 3, in order to intentionally make the PSS of the newly selected ID different. If there is a plurality of previously observed or tracked D2DSSs, the ID of the newest D2DSS may be first excluded or an ID having maximum receive power may be first excluded. Alternatively, a newest ID having receive power greater than or equal to a threshold may be first excluded.

Hereinafter, a detailed combination when the PD2DSS is configured by repeating the PSS will be described. When the PD2DSS is configured by repeating the same PSS, the observed PSS or the previously tracked PSS (or D2DSS ID) is first excluded and the remaining unused PSS is first used. If there is a plurality of PSSs, a most recently observed PSS is first excluded. Alternatively, as described above, an ID having largest receive power is first excluded or a most recently observed D2DSS having receive power greater than or equal to a threshold is first excluded. Then, an SSS is randomly selected from the SD2DSS. At this time, the ID of the observed SSS may be first excluded.

Alternatively, when the PD2DSS includes a plurality of PSSs, each PSS includes a combination of independent root sequences and the PSS having a combination of independent root sequences is repeated, the PSS transmitted by the newly selected SRN excludes the previously observed (tracked) PSS and randomly selects one of the remaining PSSs. (As the method of excluding the previously observed PSS, one of the above-described methods is similarly applicable.) That is, all PSSs are different from previously observed PSSs. Alternatively, as the PD2DSS transmitted by the newly selected SRN, the previously tracked PD2DSS may be excluded. (This method is different from the above-described method in that the same PSS is likely to be used at the same location in the combination of PSSs.)

The PD2DSS (PSS) may use the previously observed PSS and the SD2DSS may use an SSS different from the previously observed SSS. This is because the PD2DSS has an SFN and is mainly used to acquire timing information and the SD2DSS is likely to be used for frequency offset estimation. At this time, timing may be used without change and, instead, the frequency offset is preferably initialized when the SRN is changed.

Relationship Between Coverage and D2D Transmission Format

Distinguishing between the relayed D2DSS and the D2DSS transmitted by the UE may be distinguishing between relaying the PSS/SSS timing of the eNB and the D2DSS transmitted by the out-of-coverage UE. That is, the D2DSS transmitted by the UE in network coverage and the D2DSS transmitted by the out-of-coverage UE should be distinguished from each other in terms of format. For convenience of description, when the in-coverage UE transmits the D2DSS by the instruction of the eNB within the network coverage or according to a specific condition, the D2DSS is transmitted at the reception timing of the PSS/SSS of the eNB and such a D2DSS is also referred to as D2DSS_net. When the D2DSS is transmitted at timing of the D2DSS transmitted by another out-of-coverage UE or when the UE determines timing thereof and transmit the D2DSS, such a D2DSS is also referred to as D2DSSue_oon. Hereinafter, an embodiment of distinguishing between D2DSSue_net and D2DSSue_oon will be described in greater detail.

In the above description, the synchronization sequence ID was differently set when the D2DSSs are classified into two formats. In an embodiment, sequences, the remainders of which are 1 by one of the synchronization sequence IDs of 0 to 503 modulo 2, is used for D2DS Sue_net and sequences, the remainders of which are 0, is used for D2DSSue_oon. Alternatively, the sequences, the remainders of which are 0, is used for D2DSSue_net and the sequences, the remainders of which are 1, is used for D2DSSue_oon. That is, the D2DSS comprises a single or a plurality of PSSs/SSSs. At this time, the even-numbered IDs of 0 to 503 sequence IDs use D2DSSue_net and the odd-numbered IDs thereof use D2DSSue_oon. Such operation is advantageous in that the PSS which uses D2DSSue_net and the USS which uses D2DSSue_oon may be uniformly mixed. Since the performance of the PSS may be slightly changed according to the sequence ID, use of a specific sequence in a specific D2DSS set is not preferable in terms of performance. However, in order to simplify operation, a rule for enabling the synchronization sequences including specific PSSs to use D2DSSue_net and enabling the synchronization sequences including the remaining PSSs to use D2DSSue_oon may be set. In such operation, the D2D UEs may detect only the PSS to determine/distinguish whether the PSS is D2DSS_net or D2DSS_oon. As another embodiment, D2DSS_net may be configured by a combination of an SD2DSS sequence, the remainder of which is 1 by the ID of the SD2DSS modulo 2, and a PD2DSS sequence set and D2DSS_oon may be configured by a combination of an SD2DSS sequence, the remainder of which is 0 by the ID of the SD2DSS modulo 2, and a PD2DSS sequence set. This method enables the PSSs to be uniformly distributed in D2DSS_net and D2DSS_oon.

Meanwhile, distinguishing between D2DSSue_net and D2DSSue_oon depending on whether the D2DSS sequence ID is an even number or odd number may be modified to differently setting the odd/even number depending on whether an original synchronization source is an eNB or a UE. This is different from distinguishing between D2DSSue_net and D2DSSue_oon depending on whether the D2DSS sequence ID is an even number or odd number in that an out-of-coverage UE detects the D2DSS of an in-coverage UE in partial network coverage and then uses the odd-numbered or even-numbered ID upon transmitting the D2DSS at D2DSS detection timing to indicate whether the original synchronization source is an eNB or a UE. That is, the IDs may be distinguished to indicate the original synchronization source of the D2DSS, not to indicate that the UE for transmitting the D2DSS is in-coverage or out-of-coverage.

By expanding the above-proposed method, in addition to distinguishing between D2DSSue_net and D2DSSue_oon, the sequence IDs of 0 to 503 are classified into N sets, some IDs may use sets of D2DSSue_net and the remaining IDs may use sets of D2DSSue_oon. At this time, the number of sets of D2DSSue_net and the number of sets of D2DSSue_oon may be predetermined. At this time, the number N of D2DSS sets may be determined and, for example, the IDs may be classified into sets according to a value obtained by the sequence IDs modulo N. Classification of sets is performed in order to classify D2DSSs again according to a specific purpose and simplify operation of a UE which receives the D2DSS. For example, assume that the D2DSSs may be classified into four sets of the PSS/SSS IDs, that is, two sets of D2DSSue_net and two sets of D2DSSue_oon. At this time, a rule for using set 1 as the sets of D2DSSue_net when the UE directly relays the PSS/SSS of the eNB and using set 2 when the UE, which has received set 1, performs transmission again may be set. As D2DSSue_oon, similarly, set 3 may be used when transmission is performed at the timing of another UE and set 4 may be used when transmission is performed regardless of the timing of another DH2DSS. At this time, in order to classify D2DSSue_net and D2DSSue_oon according to the odd number and the even number, sequences, the remainders of which are 1 and 3 by dividing the PSS/SSS sequence IDs by 4, are used as D2DSSue_net and sequences, the remainders of which are 0 and 2, are used as D2DSSue_oon.

Classifying the D2DSS sequence IDs into N sets may be used to distinguish between the original synchronization sources of the D2DSS. At this time, instead of classifying the original synchronization sources into two sets, that is, eNB and UE, the original synchronization source may be classified into N1 sets in case of the eNB and divided into N2 sets in case of the UE, for another use. For example, the cell IDs of the eNB are divided into D2DSS sets, thereby reducing sequence collision using different sequences when different cells are original synchronization sources. Similarly, even when the UEs are the original synchronization sources, the original synchronization sources are classified into a plurality of sets such that different sequence IDs are used for the synchronization sources of different UE IDs.

If D2DSSue_net is transmitted according to the instruction of the eNB and D2DSSue_oon is freely transmitted by the UE, the sizes of the sets of D2DSSue_net and D2DSSue_oon may be differently set. For example, the number of D2DSSs of D2DSSue_oon may be larger than that of D2DSSue_net. As an embodiment, when the remainder is 0 by the synchronization sequence IDs modulo 4, D2DSSue_net may be used and, otherwise, D2DSSue_oon may be used.

Meanwhile, currently, the formats of the SSS transmitted in SF 0 and the SSS transmitted in SF 5 are differently set as shown in Equation 1 below.

$$d(2n) = \begin{cases} s_0^{(m_0)}(n)c_0(n) & \text{in subframe 0} \\ s_0^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

Equation 1

Such a structure may be used to distinguish between a D2DSS which is an ISS and a D2DSS which is not an ISS, in D2DSSue_oon. For example, the SD2DSS of the D2DSS, which is the ISS, of D2DSSue_oon is transmitted in the format of the SSS transmitted in SF 0 (5) and the SD2DSS of the D2DSS, which is not the ISS, of D2DSSue_oon is transmitted in the format of the SSS transmitted in SF 5 (0). This method may use all sequence IDs of D2DSSue_oon. In particular, since D2DSSue_oon is transmitted by the UE, synchronization performance may deteriorate when the UEs use the same sequence. In out-of-coverage, the number of UE IDs is sufficient and thus different UEs are preferably prevented from using the same sequence in the same SF. At this time, if it is necessary to classify the D2DSSs transmitted by the UE into a D2DSS which is an ISS and a D2DSS which is not an ISS, the above-proposed method may be used.

The property of the structure of the SSS changed according to SF may be used to distinguish between D2DSSue_net and D2DSSue_oon. For example, the SD2DSS of D2DSSue_net is transmitted in the format of the SSS transmitted in SF 0 (5) and the SD2DSS of D2DSSue_oon is transmitted in the format of the SSS transmitted in SF 5 (0). That is, the D2DSS is transmitted in the format of the SSS transmitted in SF 0 (5) when the in-coverage UE transmits the D2DSS and the D2DSS is transmitted in the format of the SSS transmitted in SF 5 (0) when the out-of-coverage UE transmits the D2DSS. The method of changing the format of the SSS to indicate specific information may distinguish between the formats of D2DSSue_net and D2DSSue_oon while utilizing all the sequence IDs of 0 to 503. If some of SSSs are not used as SD2DSSs due to PAPR problems, the number of sequences of the D2DSSs may be reduced. In this case, when D2DSSue_net and D2DSSue_oon are distinguished while changing the format of the SSS, the number of sequences can be prevented from being further reduced by set classification. As another example, when one subframe includes two SD2DSS symbols, D2DSS_net is arranged in order of SSSs of SF0 and SF5 and D2DSS_oon is arranged in order of SSSs of SF5 and SF0, thereby distinguishing between D2DSS_net and D2DSS_oon.

The D2DSS sequence IDs and/or SSS formats may be used to indicate the D2DSS resource index within the resource region in which the D2DSS is transmitted. The SSS formats may be classified into a format for transmission in SF0 and a format for transmission in SF5. When these formats are SSS_A and SSS_B, the D2DSS sets are divided according to the SF index. At this time, the groups may be distinguished by a combination of D2DSS sequence IDs and/or the SSS formats. For example, if the resource region of the D2DSS includes N SFs (or slots, sets or OFDM symbols), a rule for using an SSS format X in a sequence, the remainder of which is i by the sequence ID in an i-th resource region modulo N, may be set. Here, X may be preset to a specific value in each D2DSS resource. Here, X is a specific value of each D2DSS resource and may be predetermined. Using this method, the UE, which has received the D2DSS, may detect the D2DSS and determine in which D2DSS resource the D2DSS is transmitted.

In which period the D2DSS is transmitted may be indicated using the D2DSS sequence ID and/or the structure of the SSS. For example, a rule for dividing the D2DSS sequence IDs into specific sets in advance and transmitting the ID of a specific set in a specific period upon transmitting the D2DSSs may be set. At this time, the ID transmitted in the specific period may be mapped one-to-one to the D2DSS ID in another set. Accordingly, the UE, which has first transmitted the D2DSS, may transmit another one-to-one mapped ID to indicate in which period the D2DSS is currently transmitted, upon reaching a specific D2DSS period. Alternatively, by changing the structure of the SSS, it is possible to indicate whether the D2DSS is transmitted in an even-numbered period or an odd-numbered period. If the period of the D2DSS is N ms, SSS_A (SSS_B) is used in the even-numbered period and SSS_B (SSS_A) is used in the odd-numbered period. Alternatively, the D2DSS transmitted in the period which is a multiple of a specific number uses SSS_A (SSS_B) and, in the other cases, SSS_B (SSS_A) is used, thereby determining the period of the currently transmitted D2DSS.

Using the D2DSS sequence ID and/or the structure of the SSS, a (coarse) radio frame number may be indicated. For example, when the radio frame number (or D2D frame number) in which the D2DSS is transmitted is a multiple of a specific number T (or when a value obtained by a frame number modulo Y is T, at this time, Y and T are configurable or predetermined values), the transmitted D2DSS is transmitted using SSS_A to indicate the radio frame in which the D2DSS is transmitted.

Hereinafter, a method of scrambling a PD2DSCH and configuring a DMRS will be described. The PD2DSCH may be demodulated using a D2DSS as an RS and may be transmitted in a state of including a separate RS as described above. At this time, the base sequence of the RS or the codeword scrambling sequence of the PD2DSCH are preferably derived from a D2DSS ID. This is because, when different D2DSSs are accidentally transmitted at the same timing and use the same RS, PD2DSCH decoding performance extremely deteriorates. At this time, when D2DSS_net and D2DSS_oon are not distinguished by the ID but are distinguished by the format of the SSS, it is determined that two specific UEs use the same ID and the same scrambling sequence or the same DMRS are likely to be used. Accordingly, in order to prevent this problem, the scrambling sequence of the PD2DSCH or the DMRS sequence may be generated in consideration of in-coverage or out-of-coverage.

First, a method of configuring a DMRS of a legacy LTE PUSCH and configuring a scrambling sequence will be described.

A Zadoff-chu sequence for a base sequence value of a PUSCH DMRS of LTE is determined by Equation 2.

$$x_q(m) = e^{-j\frac{\pi q m(m+1)}{N_{ZC}^{RS}}}, 0 \leq n \leq N_{ZC}^{RS} - 1 \quad \text{Equation 2}$$

In Equation 2, a value q which is a root value is determined by Equation 3.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{Equation 3}$$

In Equation 3, a value u is determined by Equation 4.

$$u = (f_{gh}(n_s) + f_{ss}) \bmod 30 \quad \text{Equation 4}$$

In Equation 4, a value $f_{gh}(n_s)$ is determined by Equation 5.

$$f_{gh}(n_0) = \begin{cases} 0 & \text{if group hopping is disabled} \\ \left(\sum_{i=0}^{?} c(8n_s + i) \cdot 2^i\right) \bmod 30 & \text{if group hopping is enabled} \end{cases} \quad \text{Equation 5}$$

In Equation 5, a value $c_{init}$ for c(i) is determined by Equation 6.

$$c_{init} = \left\lfloor \frac{n_{ID}^{RS}}{30} \right\rfloor \quad \text{Equation 6}$$

In Equation 6, a value $n_{ID}^{RS}$ is determined by a cell ID or higher layer signaling. In Equation 4, a value $f_{ss}$ is determined by Equation 7, in case of a PUSCH.

$$f_{ss}^{PUSCH} = (N_{ID}^{cell} + \Delta_{ss}) \bmod 30 \quad \text{Equation 7}$$

In Equation 7, $N_{ID}^{cell}$ is a cell ID value and $\Delta_{ss}$ is a value received from a higher layer. A value v is determined by Equation 8.

$$v = \begin{cases} c(n_s) & \text{if group hopping is disabled and sequence hopping is enabled} \\ 0 & \text{otherwise} \end{cases} \quad \text{Equation 8}$$

In Equation 8, $c_{init}$ a value for c(i) is determined by Equation 9.

$$c_{init} = \left\lfloor \frac{n_{ID}^{RS}}{30} \right\rfloor \cdot 2^s + f_{98}^{PUSCH} \quad \text{Equation 9}$$

In Equation 9, a value $n_{ID}^{RS}$ is determined by a cell ID or higher layer signaling, and $f_{ss}^{PUSCH}$ is determined by Equation 7.

Upon generating the scrambling sequence of a legacy LTE PUSCH, initialization parameter configuration is determined by an equation: $c_{init} = n_{RNTI} \cdot 2^{14} + q \cdot 2^{15} + \lfloor n_s/2 \rfloor \cdot 2^9 + N_{ID}^{cell}$, where $n_{RNTI}$ and $N_{ID}^{cell}$ indicate and RNTI value and a cell ID, respectively.

As an embodiment of a method of differently configuring the DMRS of the PD2DSCH according to in-coverage or out-of-coverage, $n_{ID}^{RS}$ or $N_{ID}^{cell}$ may be set to $2*n_{ID}^{D2DSS}+I$, $2*N_{ID}^{D2DSS}+I$ (or $I*2^9+N_{ID}^{D2DSS}$). That is, DRMS sequence configuration is changed according to in-coverage or out-of-coverage). Here, $n_{ID}^{D2DSS}$ and $N_{ID}^{D2DSS}$ indicate D2DSS IDs and I indicates a binary indicator indicating in-coverage or out-of-coverage. In case of scrambling, in the PD2DSCH, a slot number $n_s$ may not be used or may be fixed to a specific value (e.g., $n_s=0$). Here, when the transmission period of the PD2DSCH is a multiple of 10 ms, the same slot number is always used. That is, the specific value may be set to a subframe offset in which the D2DSS is transmitted. Alternatively, a value obtained by modulo operation of 20 while increasing SFN0 or D2D frame number 0 by +1 whenever the PD2DSCH is transmitted may be used as $n_s$, in order to change scrambling in every PD2DSCH transmission to obtain randomization effect. In the PD2DSCH, a PUSCH codeword parameter q may not be used or may be fixed to a specific value. Here, the D2D subframe number refers to a subframe number recognized by a D2D transmission UE.

As an embodiment, the initialization parameter of the scrambling sequence of the PD2DSCH may be configured as follows.

$$c_{init} = 2 \cdot N_{ID}^{D2DSS} + I$$

where, $N_{ID}^{D2DSS}$ indicates a D2DSS ID and I indicates a binary indicator indicating in-coverage or out-of-coverage. This may be generalized to $c_{init} = f(N_{ID}^{D2DSS}, I)$, where f is a predetermined function. According to the proposed method, in the PD2DSCH, different scrambling sequences are used according to in-coverage or out-of-coverage.

In the above method, I may be transmitted in CRC masking of the PD2DSCH. That is, the CRC mask may be changed depending on whether PD2DSCH is in in-coverage or out-of-coverage. Alternatively, I may be transmitted as part of information bits of the PD2DSCH. In the above description, even when the D2DSS is classified into D2DSS_net and D2DSS_oon, net and oon are checked in the PD2DSCH again.

Configuration of Apparatus According to Embodiment of the Present Invention

Figure 11:
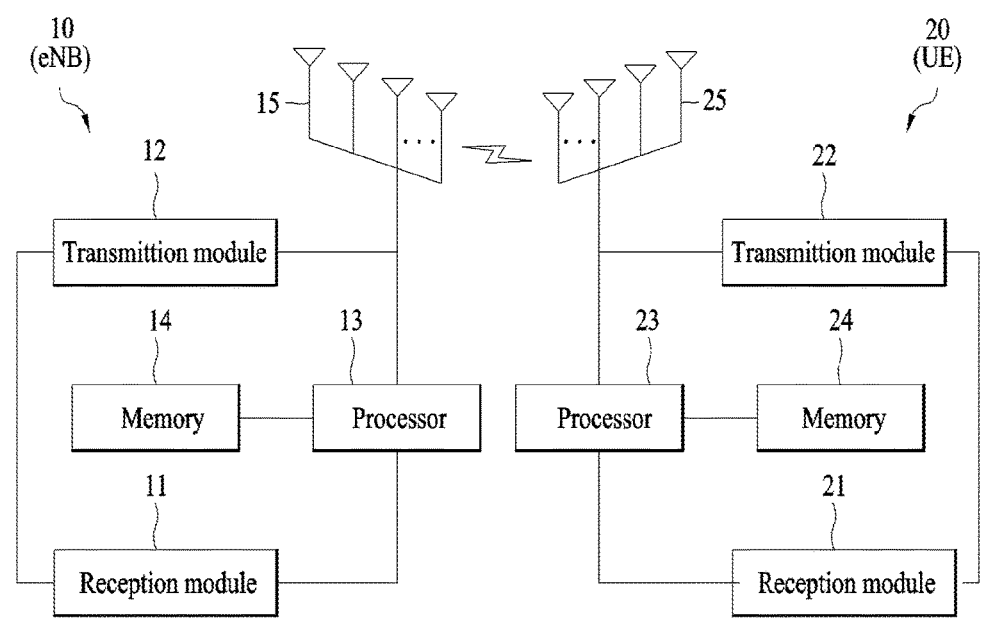
FIG. 11 is a diagram showing the configuration of a transmission and reception apparatus.

FIG. 11 is a diagram showing the configuration of a transmission point apparatus and a UE apparatus according to an embodiment of the present invention.

Referring to FIG. 11, the transmission point apparatus 10 according to the present invention may include a reception module 11, a transmission module 12, a processor 13, a memory 14 and a plurality of antennas 15. Since the plurality of antennas 15 is used, the transmission point apparatus may support MIMO transmission/reception. The reception module 11 may receive a variety of signals, data and information from the UE in uplink. The transmission module 12 may transmit a variety of signals, data and information to the UE in downlink. The processor 13 may control the overall operation of the transmission point apparatus 10.

The processor 13 of the transmission point apparatus 10 according to one embodiment of the present invention may process operations necessary for the embodiments.

The processor 13 of the transmission point apparatus 10 may process information received by the transmission point apparatus 10 and information to be transmitted to an external device and the memory 14 may store the processed information for a predetermined time and may be replaced by a component such as a buffer (not shown).

Referring to FIG. 11, the UE apparatus 20 according to the present invention may include a reception module 21, a transmission module 22, a processor 23, a memory 24 and a plurality of antennas 25. Since the plurality of antennas 25 is used, the UE apparatus may support MIMO transmission/reception. The reception module 25 may receive a variety of signals, data and information from the eNB in downlink. The transmission module 22 may transmit a variety of signals, data and information to the eNB in uplink. The processor 23 may control the overall operation of the UE apparatus 20.

The processor 23 of the UE apparatus 20 according to one embodiment of the present invention may process operations necessary for the embodiments.

The processor 23 of the UE apparatus 20 may process information received by the UE apparatus 20 and information to be transmitted to an external device and the memory 24 may store the processed information for a predetermined time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 11, the description of the transmission point apparatus 10 may also be equally applied to a device functioning as a downlink transmission subject or an uplink reception subject. The description of the UE apparatus 20 may also be equally applied to a relay station device functioning as an uplink transmission subject or a downlink reception subject.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method of transmitting a device-to-device (D2D) synchronization signal at a user equipment (UE) in a wireless communication system, the method comprising:
    generating, by a processor in a first UE, primary and secondary D2D synchronization signals in the D2D synchronization signal; and
    transmitting, by the first UE to a second UE, a subframe including the primary and secondary D2D synchronization signals,
    wherein if the first UE is an in-coverage UE, an identifier (ID) of a primary D2D synchronization signal for the in-coverage UE is selected from an in-coverage ID set, and if the first UE is an out-of-coverage UE, an ID of the primary D2D synchronization signal for the out-of-coverage UE is selected from an out-of-coverage ID set, and
    wherein primary D2D synchronization signals generated from a plurality of IDs included in the in-coverage ID set are identical, and primary D2D synchronization signals generated from a plurality of IDs included in the out-of-coverage ID set are identical.

2. The method according to claim 1, wherein, if at least one of the primary D2D synchronization signal and the secondary D2D synchronization signal in the subframe comprises two or more sequences transmitted in the subframe at different times, the two or more sequences are different from one another.

3. The method according to claim 2, wherein the different sequences are sequences having different root indices or Zadoff-chu sequences having a different cyclic shift.

4. The method according to claim 3, wherein the sequence configuring the primary D2D synchronization signal is a Zadoff-chu sequence and the sequence configuring the secondary D2D synchronization signal is an M-sequence.

5. The method according to claim 2, wherein a root sequence for generating the D2D synchronization signal when the first UE is a synchronization reference node is different from a root sequence for generating the D2D synchronization signal when the first UE is a node for relaying a synchronization signal.

6. The method according to claim 2, wherein the subframe in which the D2D synchronization signal is transmitted indicates whether the first UE is a synchronization reference node or a node for relaying a synchronization signal.

7. The method according to claim 2, wherein the first UE indicates whether the first UE is an in-coverage UE or an out-of-coverage UE via a root sequence for generating the D2D synchronization signal in the subframe in which the D2D synchronization signal is transmitted.

8. The method according to claim 7, wherein, if the first UE is a D2D synchronization reference node, an ID used to generate the D2D synchronization signal succeeds to an ID used by a previous synchronization reference node before the first UE becomes the D2D synchronization reference node.

9. The method according to claim 1, wherein the subframe includes information related to a time when the first UE transmits the D2D synchronization signal.

10. The method according to claim 9, wherein the information related to the time is used to estimate a change of the synchronization reference node of a UE which receives the D2D synchronization signal.

11. The method according to claim 1, wherein a reference signal included in the subframe in which the synchronization signal is transmitted is a sequence generated based on a UE ID, a cell ID, or the primary D2D synchronization signal.

12. The method according to claim 11, wherein the ID used to generate the reference signal indicates whether the first UE is an in-coverage UE or an out-of-coverage UE.

13. A method of receiving a device-to-device (D2D) synchronization signal in a wireless communication system, the method comprising:

receiving, by a second UE (UE) from a first UE, a subframe including primary and secondary D2D synchronization signals in the D2D synchronization signal;

determining, by the second UE, a D2D synchronization identifier (ID) of the first UE by using the primary and secondary D2D synchronization signals; and determining, by the second UE, whether the first UE is an in-coverage UE or an out-of-coverage UE by using only the primary D2D synchronization signal, wherein if the first UE is an in-coverage UE, an ID of a primary D2D synchronization signal for the in-coverage UE is selected from an in-coverage ID set, and if the first UE is an out-of-coverage UE, an ID of the primary D2D synchronization signal for the out-of-coverage UE is selected from an out-of-coverage ID set, and wherein primary D2D synchronization signals generated from a plurality of IDs included in the in-coverage ID set are identical, and primary D2D synchronization signals generated from a plurality of IDs included in the out-of-coverage ID set are identical.

* * * * *